US012454922B2

(12) United States Patent
Del Gobbo et al.

(10) Patent No.: US 12,454,922 B2
(45) Date of Patent: Oct. 28, 2025

(54) ELECTRONIC PRESSURE REGULATOR

(71) Applicant: Metatron S.p.A., Castel Maggiore (IT)

(72) Inventors: Pierpaolo Del Gobbo, Castel Maggiore (IT); Paolo Scaglione, Castel Maggiore (IT)

(73) Assignee: Metatron S.P.A., Castel Maggiore (IT)

( * ) Notice: Subject to any disclaimer, the term of this patent is extended or adjusted under 35 U.S.C. 154(b) by 0 days.

(21) Appl. No.: 18/776,320

(22) Filed: Jul. 18, 2024

(65) Prior Publication Data

US 2025/0154909 A1    May 15, 2025

(30) Foreign Application Priority Data

Nov. 9, 2023  (IT) .................. 102023000023655

(51) Int. Cl.
  *F02D 19/02*   (2006.01)
  *G05D 16/20*   (2006.01)
(52) U.S. Cl.
  CPC ....... *F02D 19/022* (2013.01); *G05D 16/2097* (2019.01)
(58) Field of Classification Search
  CPC .... F02D 19/022; F02D 19/023; F02D 19/027; F02D 41/00; F02D 41/3854;
  (Continued)

(56) References Cited

U.S. PATENT DOCUMENTS 8,006,668 B1 *   8/2011   Guglielmo ............ F02D 19/023
                                              123/458
8,132,561 B2 *   3/2012   Audisio ............. F02M 21/0239
                                              123/527

(Continued)

FOREIGN PATENT DOCUMENTS

CN    204738877 U    11/2015
CN    208268497 U    12/2018

OTHER PUBLICATIONS

Italian Search Report and Written Opinion dated Mar. 28, 2024, 7 pages.
8,136,506
B1
*
3/2012
Guglielmo ................................................ F02D 19/027
123/458

*Primary Examiner* — Grant Moubry
(74) *Attorney, Agent, or Firm* — Heslin Rothenberg Farley and Mesiti, PC; Victor A. Cardona Esq.

(57) ABSTRACT

A two-stage electronic pressure regulator includes an inlet duct, an intermediate duct, an outlet duct, a first, mechanical, valve arranged between the inlet duct and the intermediate duct, and a second, electronic, valve arranged between the intermediate duct and the outlet duct. The mechanical valve includes a regulation element rigidly connected to a piston slidably mounted in a cylinder, defining a first chamber and a second chamber that are fluidically separated by the piston. The mechanical valve includes an elastic element housed in the first chamber and configured to push the piston in the direction of opening of the mechanical valve. The mechanical valve includes a fluid duct configured to set in fluid communication the intermediate duct and the second chamber of the cylinder in such a way that the pressure in the intermediate duct pushes the piston in the direction of closing of the mechanical valve. The electronic pressure regulator has a further fluid duct configured to set in fluid communication the outlet duct and the first chamber of the cylinder in such a way that the pressure in the outlet duct pushes the piston in the direction of opening of the mechanical valve.

10 Claims, 4 Drawing Sheets

(58) Field of Classification Search
CPC ............... G05D 16/2097; F02B 43/00; F02M 21/0239; F02M 21/0245
See application file for complete search history.

(56) References Cited

U.S. PATENT DOCUMENTS

| | | | |
|---|---|---|---|
| 9,273,638 B2* | 3/2016 | Pursifull | F02M 57/026 |
| 11,092,091 B2* | 8/2021 | Farrow | F02D 41/3854 |
| 2005/0241624 A1* | 11/2005 | Ricco | F02M 21/0239 123/527 |
| 2017/0022910 A1* | 1/2017 | Collie | F02M 19/06 |

* cited by examiner

Prior Art

ELECTRONIC PRESSURE REGULATOR

CROSS REFERENCE TO RELATED APPLICATIONS

This application claims priority from Italian Patent Application No. 102023000023655 filed on Nov. 9, 2023, the entire disclosure of which is incorporated herein by reference.

FIELD OF THE INVENTION

The present invention relates to electronic pressure regulators (EPRs)—a term used herein also to indicate mechatronic pressure regulators—of the type comprising an inlet duct, an intermediate duct, an outlet duct, a first, mechanical, valve set between the inlet duct and the intermediate duct, and a second, electronic, valve set between the intermediate duct and the outlet duct. The first mechanical valve includes: a regulation element (or shutter) rigidly connected to a piston slidably mounted in a cylinder, thus defining a first chamber of the cylinder and a second chamber of the cylinder that are fluidically separated by the piston; a first elastic element housed in the first chamber and configured to push the piston in the direction of opening of the first mechanical valve; and a fluid duct configured to set in fluid communication the intermediate duct and the second chamber of the cylinder in such a way that the pressure in the intermediate duct pushes the piston in the direction of closing of the first mechanical valve.

The above pressure regulators can be used for regulating the pressure of a gas in various applications, such as internal combustion engines (ICEs) fueled with hydrogen ($H_2$) or natural gas (NG), such as methane ($CH_4$), where fuel injection may be direct (Direct Injection, DI) or else indirect (Port Fuel Injection, PFI). Another field of possible application of electronic pressure regulators is that of fuel cells (FCs).

PRIOR ART

In the present description, the unit of measurement "bar gauge" (bar G) will be used to indicate pressure values. Bar gauge represents the difference between the pressure in a space expressed in bar and the atmospheric pressure expressed in bar. For instance, if the atmospheric pressure is 1 bar, a pressure of 3 bar G corresponds to an absolute pressure of 4 bar.

A simple mechanical pressure regulator (MPR) device 1 is represented schematically in the diagram of FIG. 1. The mechanical pressure regulator 1 includes an inlet duct 11 and an outlet duct 12, set between which is a valve 10. The inlet pressure in the duct 11 is designated by $P_{i1}$, and the outlet pressure in the duct 12 is designated by $P_{i2}$. The valve 10 comprises:
- a regulation element (or shutter) that can close, partialize, or open the passage between the inlet duct 11 and the outlet duct 12; the sealing area between the inlet duct 11 and the shutter determines a surface (or section) on which the pressure PH acts; and
- a surface (or section) on which the pressure $P_{i2}$ acts, sealed via specific sealing elements.

The regulation element of the valve 10 can be moved in a continuous way from a completely open position (as represented schematically in FIG. 1) to a completely closed position. By regulating the percentage of opening of the valve 10, the inlet pressure PH is reduced to a target outlet value $P_{i2}$, lower than $P_{i1}$. In particular, in the diagram of FIG. 1, the valve 10 is subjected to an opening force exerted by an elastic element 14 (e.g., a spring) and by the pressure Pit that acts on the sealing area of the shutter. The valve 10 is moreover subjected to a variable closing force exerted by the outlet pressure $P_{i2}$ that acts on a given surface of the valve 10 (represented schematically by the dashed line 13), which tends to cause the valve 10 to close, acting in negative feedback. Consequently, the opening force is constant (considering a constant pressure $P_{i1}$ at inlet) and can be controlled by adequately selecting the sizing of the spring 14. The closing force is proportional to the outlet pressure $P_{i2}$ and is determined by the mechanical sizing of the internal parts of the valve 10 (in particular, by the surface on which the outlet pressure $P_{i2}$ acts). Consequently, in the mechanical regulator 1 of FIG. 1, the value of the outlet pressure $P_{i2}$ is determined by the balancing of the forces exerted by the pressure Pi acting on a specific surface, the pressure $P_{i2}$ acting on another specific surface (represented schematically by the dashed line 13), and the elastic element 14. In particular, the value of the outlet pressure $P_{i2}$ is determined in the design stage basically by choosing the mechanical characteristics of the spring 14 (elastic constant and, especially, pre-load), the surface of the valve on which the pressure $P_{i2}$ acts, and the surface of the valve on which the pressure Pit acts. A mechanical pressure regulator device 1, as represented schematically in FIG. 1, may be obtained using different architectures: single-stage, dual-stage, with differential piston, with diaphragm, and so forth. The disadvantages of a mechanical pressure regulator as illustrated herein are substantially the following:
- the value of the outlet pressure $P_{i2}$ is substantially a design value: it is not possible to change the value of the outlet pressure during operation of the regulator, except for slight corrections that can be made by means of an auxiliary detection line;
- the value of the outlet pressure $P_{i2}$ depends on the value of the inlet pressure Pit (hence, in the case where there is not a constant source of inlet pressure—for example, a tank that is emptying out—the outlet pressure $P_{i2}$ depends on the filling level of the tank; this phenomenon takes the name of "supply-pressure effect" and reduces the performance of the valve in terms of precision of regulation of the outlet pressure);
- the value of the outlet pressure $P_{i2}$ depends on the rate of the flow of gas that traverses the valve 10 on account of the head losses that are generated and that are not compensated;
- the precision of regulation of the outlet pressure $P_{i2}$ depends on the mechanical hysteresis of the device; and
- the outlet pressure $P_{i2}$ is determined at the outlet of the regulator. Normally, a generic application envisages a pipe that connects the outlet of the pressure regulator to the component where the pressure is to be controlled (for example, the rail of an engine). In this pipe there is typically generated a pressure loss that is a function of the flow rate, the temperature, and/or the pressure; this loss alters the value of pressure $P_{i2}$, producing a value lower than the one desired during operation of the device in the area of the system where it is really of interest to control the pressure (for example, the rail for internal combustion engines, or the inlet of the stack for applications in fuel cells).

The limitations and disadvantages referred to above may be overcome or mitigated by the use of an electronic pressure regulator 2 (EPR), as represented schematically in the diagram of FIG. 2. The electronic pressure regulator 2 comprises an inlet duct 21 and an outlet duct 22, set between which is a valve 20. The inlet pressure in the duct 21 is designated by $P_{21}$, and the outlet pressure in the duct 22 is designated by $P_{22}$. The regulation element (or shutter) of the valve 20 can be moved in a continuous way from a completely open position to a completely closed position (as represented schematically in FIG. 2). By regulating the percentage of opening of the valve 20, the inlet pressure $P_{21}$ is reduced to a target outlet value $P_{22}$, lower than $P_{21}$. In electronic pressure regulators it is possible to control opening of the valve 20 in an arbitrary way, without acting in feedback, and it is hence possible to vary the value of the outlet pressure $P_{22}$ in the operating range during operation of the regulator 2 without any limitations (i.e., ideally between the ambient pressure of 0 bar G, when the valve 20 is completely closed, and the inlet pressure $P_{21}$, when the valve 20 is completely open). In particular, opening of the valve 20 is obtained via an electrically-controlled solenoid 23, which manages positioning of the regulation element of the valve 20 so as to obtain the desired value of the outlet pressure $P_{22}$. Conventionally, the electronic component of an EPR valve is actuated by means of a so-called pressure proportional valve (PPV) of the normally-closed type, as illustrated in the diagram of FIG. 2. Here, the regulation element of the valve 20 is subjected to a constant closing force exerted by an elastic element 24 (e.g., a spring), which tends to cause the valve 20 to close, as well as to a variable opening force exerted by the solenoid 23 and by the inlet pressure $P_{21}$ that acts on the regulation element, which tends to cause the valve 20 to open. Consequently, the closing force is constant and is determined by the sizing of the spring 24, whereas the opening force is variable as a function of the electrical driving of the solenoid 23 and of the inlet pressure $P_{21}$. The electrical driving may be of the pulse-width-modulation (PWM) type. For instance, when the PWM signal has the maximum duty-cycle the opening force will be maximum, whereas when the PWM signal has the minimum duty-cycle the opening force will be minimum. Hence, in the electronic regulator 2 of FIG. 2 the value of the outlet pressure $P_{22}$ is determined by the balancing of the forces exerted by the elements 23 and 24 and of the inlet pressure Par that acts on the sealing area. Since the opening force impressed by the solenoid 23 can be freely varied, the value of the outlet pressure $P_{22}$ may vary ideally from ambient pressure (i.e., 0 bar G) to the inlet pressure $P_{21}$. Notwithstanding this, also an electronic pressure regulator as represented schematically in FIG. 2 has some limitations. In particular:

the maximum value of the outlet pressure $P_{22}$ is in any case lower than the value of the inlet pressure $P_{21}$ in so far as the PPV causes an (albeit minimal) pressure drop between the inlet and the outlet even in the condition of maximum opening; and the pressure difference between the inlet and the outlet ($P_{21}$-$P_{22}$) is limited to a certain maximum value in so far as, if this difference is excessive, the valve 20 starts to leak (i.e., it tends to open even though the solenoid 23 is completely inactive); the maximum value of the aforesaid difference $P_{21}$-$P_{22}$ basically depends on the closing force impressed by the spring 24; i.e., it depends on the mechanical characteristics of the spring 24 (elastic constant and, especially, pre-load), and—once the desired value of the outlet pressure $P_{22}$ has been fixed—it determines a limitation of the maximum applicable inlet pressure $P_{21}$.

In order to improve the performance and expand the possible fields of application (i.e., extend the range of pressure applicable at inlet to the regulator), an electronic pressure regulator is usually constituted by two cascaded stages (i.e., two stages set in series), combining a mechanical regulator 1 set as first stage and an electronic regulator 2 set as second stage, as illustrated schematically in the diagram of FIG. 3 and in the corresponding scheme of FIG. 4. In particular, the diagram of FIG. 3 exemplifies a two-stage electronic regulator 3, whilst FIG. 4 is a lateral cross-sectional view of a possible embodiment of the aforesaid two-stage electronic regulator 3.

The two-stage electronic pressure regulator 3 comprises an inlet duct 31, an intermediate duct 32, and an outlet duct 33. Set between the duct 31 and the duct 32 is a first, mechanical, regulation stage 1, which includes a valve 10 and regulation means 13 and 14 as discussed previously. Set between the duct 32 and the duct 33 is a second, electronic, regulation stage 2, which includes a PPV 20 and regulation means 23 and 24, as also discussed previously. The inlet pressure in the duct 31 is denoted by $P_{31}$, the intermediate pressure in the duct 32 (also known as inter-stage pressure) is denoted by $P_{32}$, and the outlet pressure in the duct 33 is denoted by $P_{33}$. For simplicity, there is not considered here as regulation element the effect on the pressure $P_{32}$ of the pressure $P_{31}$ acting on the sealing surface at the inlet of the valve 10, nor is the effect on the pressure $P_{33}$ of the pressure $P_{32}$ acting on the sealing surface at the inlet of the valve 20. Consequently, in the two-stage regulator 3 the variable closing force that acts on the regulation element of the valve 10 is exerted by the intermediate pressure $P_{32}$. The design of the valve 10 is such that the inlet pressure Par tends to cause the valve 20 to open, the outlet pressure $P_{32}$ tends to cause the valve 10 to close, the pressures $P_{31}$ and $P_{32}$ act on surfaces of different sizes (differential piston), whilst the pressure difference between the intermediate duct 32 and the outlet duct 33 (i.e., the pressure drop $P_{32}$-$P_{33}$ across the PPV 20) tends to cause the electronic valve 20 to open (i.e., cause it to leak).

Illustrated in FIG. 4 are some details of implementation of a possible embodiment of a two-stage pressure regulator 3. In particular, the valve 10 of the first stage comprises a pin-operated regulation element (or shutter) 402, fixed with respect to a piston 404 that is free to move slidably within a cylinder 406 guided by two guides 407A and 407B. The piston 404 divides the cylinder 406 into two chambers 406A and 406B that are fluidically isolated from one another, and is fluid-tight with respect to them thanks to the dynamic seals 409A and 409B. The first chamber 406A is delimited between the end wall 408A of the cylinder 406, the dynamic seal 409A, a first wall 404A of the piston 404 giving out into the chamber 406A, and the dynamic seal 409B in such a way that a spring 14 extending in the chamber 406A coaxially with respect to the piston 404 and bearing upon the walls 404A and 408A acts, appropriately pre-loaded in compression, to move the piston 404 away from the wall 408A of the cylinder, i.e., to move the piston and the shutter fixed thereto away from the seat of the valve 10, thus causing opening thereof. Moreover, the cylinder 406 has an opening 410 towards the outside in a wall of the chamber 406A in such a way that the chamber 406A is not fluid-tight, but rather remains at atmospheric pressure irrespective of its volume (i.e., irrespective of the position of the piston 404 in the cylinder 406). In this way, the force exerted on the piston 404 away from the valve 10 (i.e., the opening force) only depends upon the sizing of the spring, given that the pressure in the chamber 406A is constant. For this reason, the chamber 406A is also referred to as "compensation chamber". The opening 410 also carries out the function of discharging towards the outside any possible internal leakages of the two dynamic seals 409A and 409B, which, even though of slight degree (and regulated by the relevant standards within a maximum limit), with the time passing would lead to an accumulation of gas with corresponding rise in pressure, which would lead to malfunctioning of the valve. The second chamber 406B is delimited between the end wall 408B of the cylinder 406 that is opposite to the seat of the valve 10 and a second wall 404B of the piston 404 facing the inside of the chamber 406B. The chamber 406B is set in fluid communication with the intermediate duct 32 downstream of the first valve 10, for example by means of a duct that extends along the longitudinal axis of the piston 404 between the shutter of the valve 10 and the wall 404B of the piston 404. In this way, the pressure in the chamber 406B is equal to the pressure $P_{32}$ in the intermediate duct 32 and acts to move the piston 404 away from the wall 408B of the cylinder, i.e., to bring the piston and the shutter fixed thereto closer to the seat of the valve 10, thus causing closing thereof.

As compared to an electronic pressure regulator as illustrated in FIG. 2, a two-stage electronic pressure regulator 3 as illustrated schematically in FIGS. 3 and 4 can be advantageously used also for higher inlet pressures $P_{31}$, without losing the capacity to vary the outlet pressure $P_{33}$ as desired. Notwithstanding this, the two-stage architecture of FIGS. 3 and 4 still presents some limitations, in particular a limitation regarding the maximum pressure $P_{32}$ applicable in the duct 32 (i.e., the maximum inter-stage pressure), which is a direct consequence of the maximum pressure applicable at the inlet of the PPV 20 before it opens even in the absence of an electrical command. Consequently, also the maximum outlet pressure $P_{33}$ that can be obtained with this architecture is limited by the characteristic of maximum pressure differential ($P_{32}$-$P_{33}$) that can be withstood by the PPV 20 before it starts to leak, plus a certain safety margin.

In the field of pressure regulators, the documents CN 208268497 U and CN 204738877 U provide examples of the prior art.

OBJECT OF THE INVENTION

The object of the present invention is to provide an improved two-stage electronic pressure regulator that will enable outlet pressures to be obtained higher than those of known regulators (given the same inlet pressure), thus broadening the field of the possible applications, and that will also overcome other drawbacks of known pressure regulators.

SUMMARY OF THE INVENTION

With a view to achieving the aforesaid object, the subject of the present invention is an electronic pressure regulator of the type referred to at the start of the present description, which is moreover characterized in that it comprises a further fluid duct configured to set in fluid communication the outlet duct and the first chamber of the cylinder in such a way that the pressure in the outlet duct pushes the piston in the direction of opening of the first, mechanical, valve.

As will emerge in greater detail in the ensuing description, thanks to the aforesaid characteristic, the pressure regulator according to the invention makes it possible to obtain outlet pressures higher than those of known regulators. One or more embodiments make it possible, in fact, to obtain an outlet pressure that may vary from 0 bar G (atmospheric pressure) to a maximum value that—but for the head losses due to the flow through the regulator—is approximately equal to the inlet pressure. The range of interest of the values of the outlet pressure, considering applications with inlet pressures of up to 700 bar, is on the other hand limited. For instance, in the field of fuel cells, the maximum pressure required is usually much lower than 10 bar. In the field of internal-combustion engines, there are normally required pressures of up to 15 bar for indirect-injection applications (i.e., for PFI applications, with injection into the intake manifold of the engine). For direct-injection applications (which are of major interest above all for hydrogen applications) the pressure required may be comprised approximately between 40 bar and 45 bar (this being limited by current injector technology), but it is desirable to be able to raise the pressure in the rail to manage shorter injection times, as normally required by direct-injection systems. For instance, applications that require a pressure regulated between 50 bar and 100 bar are not to be excluded in future. The pressure regulator according to the present invention makes it possible to achieve such values of outlet pressure using low-cost components in line with what is today normally available on the market.

According to a further preferred characteristic, the first chamber of the cylinder does not comprise any opening towards the environment external to the electronic pressure regulator. Advantageously, this also makes it possible to avoid any undesired dispersion of gas towards the external environment, which is a problem that exists above all in low-temperature (<0° C.) weather conditions. This aspect is important for safety reasons: in fact, pressure regulators that present losses towards the outside cannot normally be homologated in line with the standards most widely used at an international level (for example, ECE R110-ISO 15500-ISO 19887-HGV 3.1-NGV 3.1-EC79-R134).

According to a further preferred characteristic, the additional fluid duct comprises a diaphragm that hinders propagation of pressure oscillations between the outlet duct and the first chamber of the cylinder. Advantageously, this prevents any possible pressure oscillations downstream of the regulator from acting on regulation of the inter-stage pressure by the first stage.

According to yet a further preferred characteristic, the second, electronic, valve comprises a proportional valve of the normally-closed and/or direct-flow type. According to a further preferred characteristic, the second, electronic, valve is sized to remain closed, in the absence of an electrical opening command, when the difference between the pressure in the intermediate duct and the pressure in the outlet duct is comprised between 0 bar and 30 bar, optionally between 0 bar and 25 bar. In this way, advantageously, it is possible to obtain outlet pressures higher than those of known regulators using a type of electronic valve that is already widespread, inexpensive, and used in such applications.

DETAILED DESCRIPTION OF THE INVENTION

Further characteristics and advantages of the invention will emerge from the ensuing description with reference to the annexed drawings, which are provided merely by way of non-limiting example and in which:

FIGS. 1 to 4 have already been discussed previously;

In the annexed figures, corresponding parts are designated by the same reference numbers.

Figure 1:
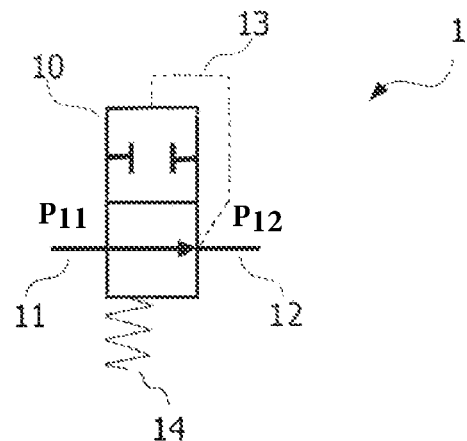
Figure 2:
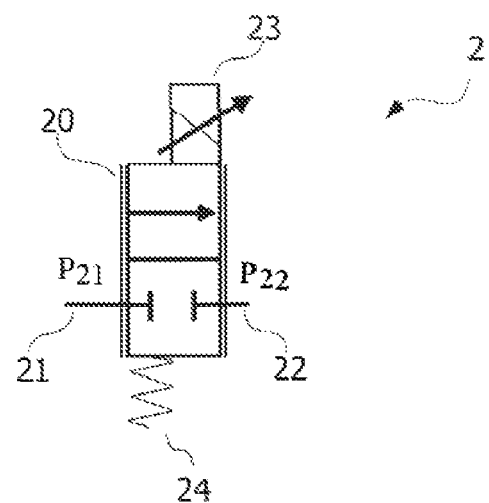

As anticipated, one or more embodiments regard a two-stage electronic pressure regulator. With reference once again to the known pressure regulator of FIGS. 3 and 4, the inventors have noted that in a conventional regulator the intermediate pressure $P_{32}$ mainly depends on the sizing of the spring element 14 of the first regulation stage (and, secondarily, also on the flow rate of the regulator and on the inlet pressure $P_{31}$), and the maximum outlet pressure $P_{33}$ must be lower than the intermediate pressure $P_{32}$ to be able to manage properly the variations linked to dynamic maneuvers to be carried out using the regulator, without risking going into saturation (i.e., without bringing the proportional valve into a condition of complete opening). In order to increase the maximum outlet pressure $P_{33}$ that can be reached, it is not possible to increase excessively the intermediate pressure $P_{32}$ (increasing pre-loading of the spring 14) because otherwise leakage would be triggered through the second regulation stage (i.e., the PPV 20) when the required outlet pressure Pas is particularly low. For instance, PPVs typically used in known regulators withstand a maximum pressure drop ($P_{32}$-$P_{33}$) of 25 bar, and considering a further safety margin of 5 bar to prevent any possible leakage, it follows that the maximum pressure difference $P_{32}$-$P_{33}$ may be equal to approximately 20 bar. Consequently, considering that the required outlet pressure $P_{33}$ can drop down to approximately 1 bar G in some applications, the intermediate pressure $P_{32}$ must be limited, by design, to a maximum of approximately 20 bar G.

Table I reproduced at the end of the present description presents sixteen cases of use of a known two-stage pressure regulator, as the following parameters vary: inlet pressure $P_{31}$, desired outlet pressure $P_{33}$, and flow rate of the regulator. In particular, in the four cases from No. 1 to No. 4 the desired outlet pressure is 1 bar G, in the four cases from No. 5 to No. 8 the desired outlet pressure is 15 bar G, in the four cases from No. 9 to No. 12 the desired outlet pressure is 18 bar G, and in the four cases from No. 13 to No. 16 the desired outlet pressure is 40 bar G. For each of the groups of four cases, the inlet pressure is 700 bar G or else 50 bar G, and the flow rate is low or else high, thus representing all four possible combinations.

Starting from Case No. 1, the pressure P32=20 bar G basically depends on the sizing and on the design of the spring 14. Given a target outlet pressure of 1 bar G, the PPV 20 is able to manage a pressure drop of 19 bar G, and the effective outlet pressure is equal to the desired one. Passing on to Case No. 2, an increase in the flow rate with respect to Case No. 1 determines a reduction of the intermediate pressure $P_{32}$ to the value of 18 bar G. The PPV 20 is able to manage a pressure drop of 17 bar G, and the effective outlet pressure is equal to the desired one. Passing on to Case No. 3, a reduction of the inlet pressure with respect to Case No. 1 determines a reduction of the intermediate pressure $P_{32}$ to the value of 15 bar G. The PPV 20 is able to manage a pressure drop of 14 bar G, and the effective outlet pressure is equal to the desired one. Passing on to Case No. 4, the increase in the flow rate and the reduction of the inlet pressure as compared to Case No. 1 determine a greater reduction of the intermediate pressure $P_{32}$ to the value of 13 bar G. The PPV 20 is able to manage a pressure drop of 12 bar G, and the effective outlet pressure is equal to the desired one.

Starting now from Case No. 5, the pressure P32=20 bar G basically depends on the sizing and on the design of the spring 14. Given a target outlet pressure of 15 bar G, the PPV 20 is able to manage a pressure drop of 5 bar G, and the effective outlet pressure is equal to the desired one. Passing on to Case No. 6, an increase in the flow rate as compared to Case No. 5 determines a reduction of the intermediate pressure $P_{32}$ to the value of 18 bar G. The PPV 20 is able to manage a pressure drop of 3 bar G, and the effective outlet pressure is equal to the desired one. Passing on to Case No. 7, a reduction of the inlet pressure as compared to Case No. 5 determines a reduction of the intermediate pressure $P_{32}$ to the value of 15 bar G. The PPV 20 is able to manage (ideally) a pressure drop of 0 bar G, and the effective outlet pressure is equal to the desired one, but the PPV 20 is practically saturated (i.e., open to the maximum extent) and does not have a margin of control on the outlet pressure. Passing on to Case No. 8, the increase in the flow rate and the reduction of the inlet pressure as compared to Case No. 5 determine a greater reduction of the intermediate pressure $P_{32}$ to the value of 13 bar G. The desired outlet pressure (15 bar G) cannot be reached, and the effective outlet pressure can at the most be equal to the intermediate pressure (13 bar G), with the PPV saturated.

Starting now from Case No. 9, the pressure $P_{32}$=20 bar G basically depends on the sizing and on the design of the spring 14. Given a target outlet pressure of 18 bar G, the PPV 20 is able to manage a pressure drop of 2 bar G, and the effective outlet pressure is equal to the desired one. Passing on to Case No. 10, an increase in the flow rate as compared to Case No. 9 determines a reduction of the intermediate pressure $P_{32}$ to the value of 18 bar G. The PPV 20 is able to manage (ideally) a pressure drop of 0 bar G, and the effective outlet pressure is equal to the desired one, but the PPV 20 is practically saturated (i.e., open to the maximum extent) and does not have a margin of control on the outlet pressure. Passing on to Case No. 11, a reduction of the inlet pressure as compared to Case No. 9 determines a reduction of the intermediate pressure $P_{32}$ to the value of 15 bar G. The desired outlet pressure (18 bar G) cannot be reached, and the effective outlet pressure can at the most be equal to the intermediate pressure (15 bar G), with the PPV saturated. Passing on to Case No. 12. the increase in the flow rate and the reduction of the inlet pressure as compared to Case No. 9 determine a greater reduction of the intermediate pressure $P_{32}$ to the value of 13 bar G. The desired outlet pressure (18 bar G) cannot be reached, and the effective outlet pressure can at the most be equal to the intermediate pressure (13 bar G), with the PPV saturated.

Following the same reasoning presented above, in Cases Nos. 13, 14, 15, and 16 the desired outlet pressure $P_{33}$ of 40 bar G can never be reached, even saturating the PPV 20, in so far as the intermediate pressure $P_{32}$ (determined by the sizing of the mechanical valve 10) is always less than the desired outlet pressure.

Consequently, known two-stage pressure regulators cannot be used in the applications that require also high outlet pressures of the regulator, as, for example, direct-injection internal combustion engines. For this purpose, retaining the known architecture of FIGS. 3 and 4, it would be necessary to select a different PPV 20, which would be able to remain closed when the pressure difference $P_{32}$-$P_{33}$ across it is higher than 25 bar (in such a way as to be able to increase the design value of the intermediate pressure $P_{32}$), but such PPVs are usually far from precise, require an excessively high solenoid-driving current, and are normally costly, cumbersome, and heavy.

In particular, there exist different types of PPVs: direct-flow PPVs, where the inlet pressure helps the valve to open; backflow PPVs, where the outlet pressure helps the valve to open; and balanced PPVs, where the inlet pressure acts on the valve, favoring closing thereof. As regards balanced PPVs, the limitation in terms of maximum inlet pressure is due simply to the maximum force that can be impressed by the solenoid to open the valve: with an appropriate design, balanced PPVs can be obtained that function with high inlet pressures, and balanced PPVs might hence be good candidates to obtain a two-stage pressure regulator that supplies a wide range of possible outlet pressures. On the other hand, balanced PPVs present some disadvantages, amongst which: the high friction that derives from the gaskets of the mobile parts, the high cost, and a poor precision of regulation, which does not render them suitable for use in a high-performance pressure regulator (i.e., one that is also precise in terms of regulation). As regards, instead, backflow PPVs, also these are able to work at high inlet pressures, but are far from widely used and are characterized by a nonlinear behavior in the first stages of opening, which renders them unsuitable for use in a high-performance pressure regulator in so far as they prove to be far from precise above all when the required flow rate is low. To return to direct-flow PPVs, discussed also with reference to FIGS. 3 and 4, it has been said that they have a poor resistance to the pressure difference between upstream and downstream before starting to leak (even when the solenoid is completely inactive, and the valve should remain completely closed), but they are widespread, inexpensive and make it possible to achieve easily good performance in terms of precision of regulation and time of response to commands.

Consequently, the inventors have devised a different architecture for a two-stage electronic pressure regulator, which makes it possible to reduce the inlet pressure to a certain desired value of outlet pressure, thus broadening the range of the possible outlet pressures achievable (i.e., increasing the value of the maximum outlet pressure that can be obtained), albeit retaining in the second regulation stage the use of a direct-flow PPV, for example sized for withstanding a maximum pressure drop of 25 bar or 30 bar.

Figure 5:
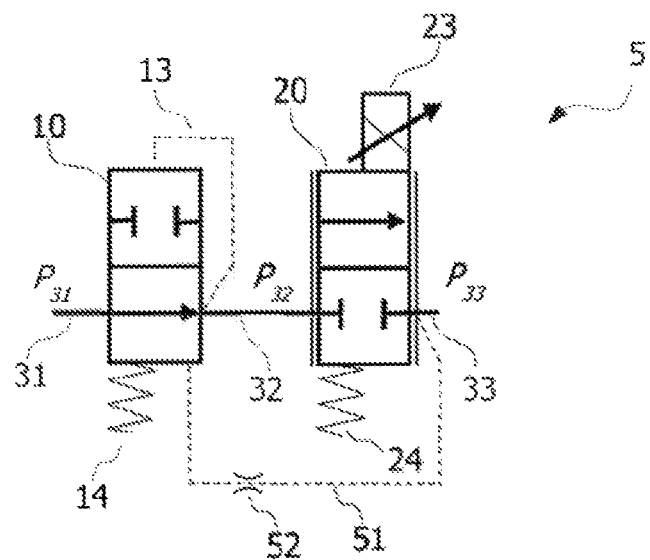
FIG. 5 illustrates a diagram of a two-stage electronic pressure regulator according to one or more embodiments of the invention.
Figure 6:
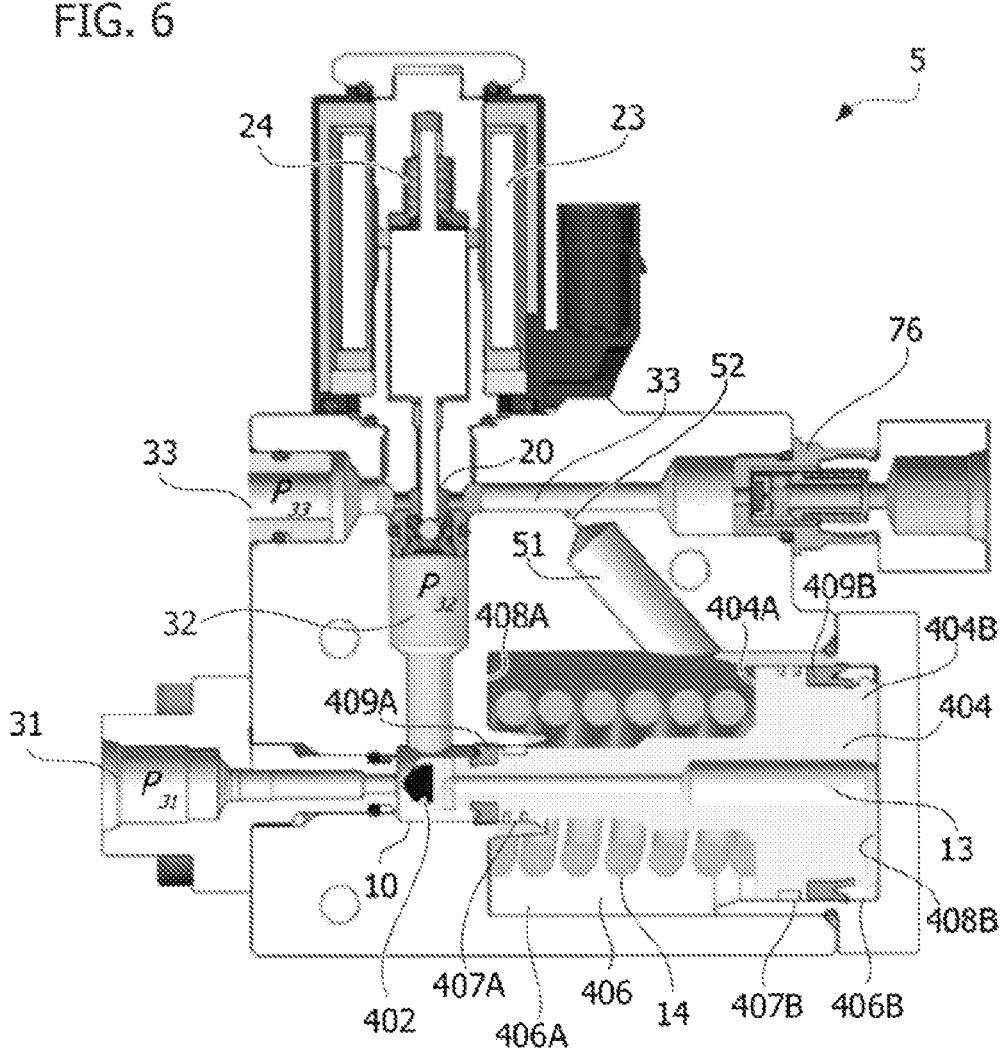
FIG. 6 is a lateral cross-sectional view of a possible embodiment of the electronic pressure regulator of FIG. 5.

The architecture of the pressure regulator according to the present invention is illustrated schematically in the diagram of FIG. 5 and in the corresponding scheme of FIG. 6. In particular, the diagram of FIG. 5 exemplifies a two-stage electronic regulator 5 according to one or more embodiments, while FIG. 6 illustrates a lateral cross-sectional view of a possible embodiment of such a two-stage electronic regulator 5.

Figure 3:
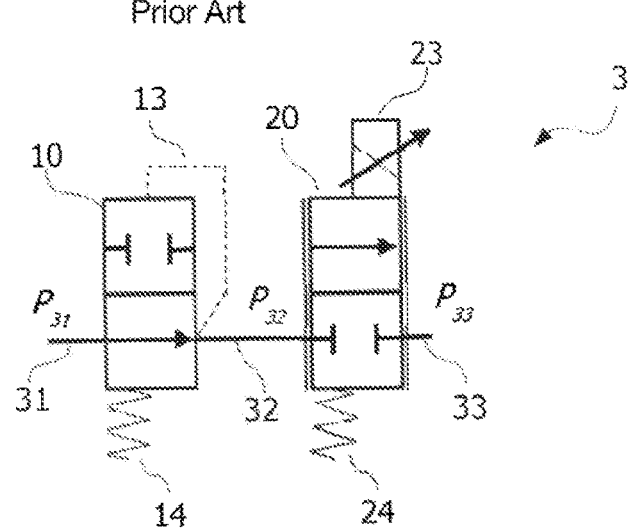
Figure 4:
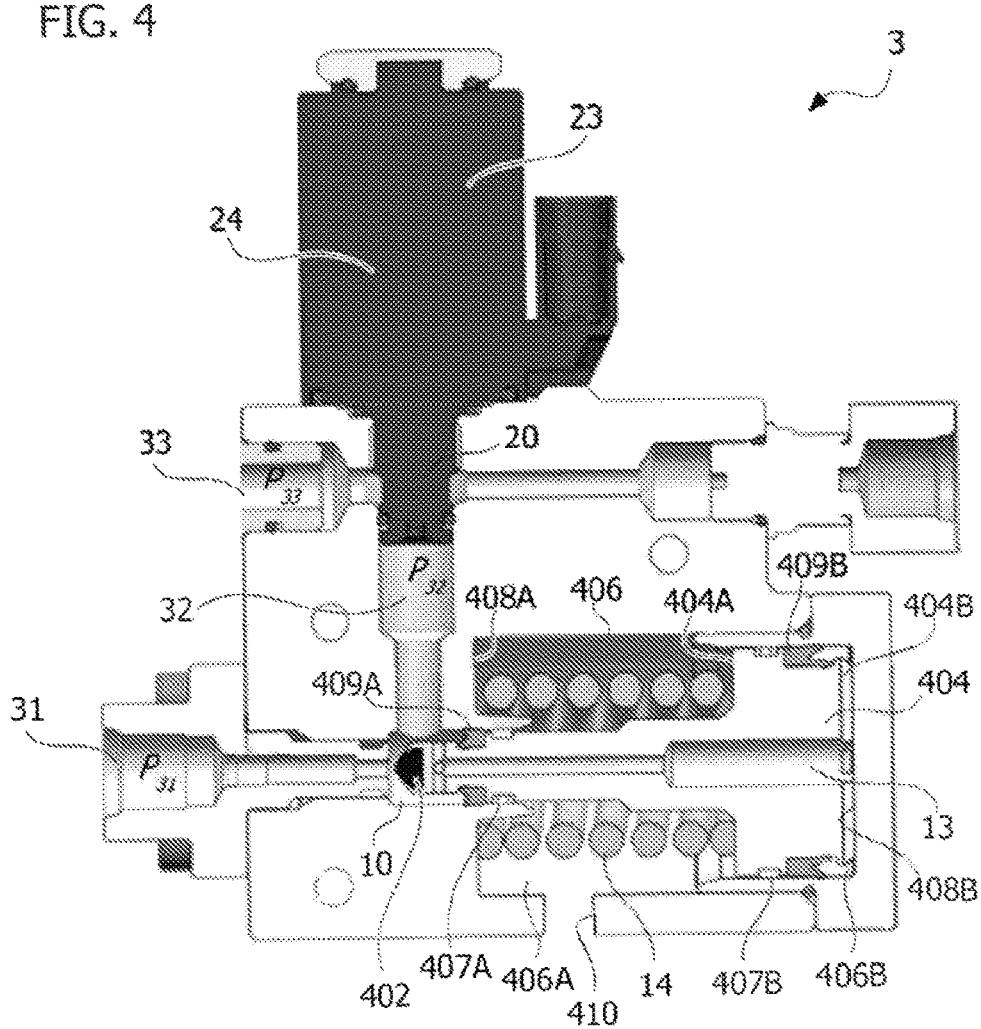

Basically, the pressure regulator 5 comprises elements that are the same as or similar to those already described with reference to FIGS. 3 and 4; i.e., they are: an inlet duct 31, the pressure of which is denoted by $P_{31}$; an intermediate duct 32, the pressure of which is denoted by $P_{32}$, an outlet duct 33, the pressure of which is denoted by Pas; a first, mechanical, regulation stage comprising a valve 10, with respective regulation means 13 and 14; and a second, electronic, regulation stage comprising a PPV 20 (e.g., a direct-flow PPV), with respective regulation means 23 and 24.

The idea underlying the present invention is that of maintaining the pressure difference $P_{32}$-$P_{33}$ across the PPV 20 practically constant as the operating conditions of the pressure regulator 5 vary, for all the possible work points of the regulator. This aim is achieved using the outlet pressure $P_{33}$ of the regulator 5, in addition to the spring 14, for controlling opening of the valve 10 of the first regulation stage, as indicated by the dashed line 51 in FIG. 5. In this way, as the pressure Pas increases, the opening force of the mechanical valve 10 increases, with consequent increase in the pressure $P_{32}$ in the intermediate duct 32. In other words, unlike known two-stage regulators, in the regulator 5 according to the invention the pressure $P_{32}$ regulated by the first stage 10 is also a function of the outlet pressure $P_{33}$; in this way, the pressure $P_{32}$ is no longer a parameter the value of which is fixed during the design stage of the regulator 5, depending only on the mechanical characteristics of the spring 14, but instead is able to adapt continuously to the operating conditions of the regulator during use.

Hence, in addition to the components already described with reference to FIGS. 3 and 4, the pressure regulator 5 according to the present invention comprises a further duct 51 that is configured to set in fluid communication the compensation chamber 406A of the first stage with the outlet duct 33 of the regulator. In order to enable the pressure in the compensation chamber 406A to be controlled and kept equal to the outlet pressure Pas, the compensation chamber 406A is no longer provided with an opening 410 towards the external environment as in known solutions; instead, the compensation chamber 406A is fluid-tight (with the exception of the duct 51).

It will be appreciated that in the lateral cross-sectional view of FIG. 6, the outlet duct 33 extends on both sides (i.e., both to the right and to the left) of the PPV 20. In other words, from the fluidic standpoint, the two portions of the duct 33 are both connected to the outlet of the PPV 20 and in direct fluid communication with one another in such a way that they are at the same pressure. As discussed further in the sequel of the present description, there can be provided a pressure-relief valve (PRV) 76, which vents from the duct 33 towards a ventilation line to maintain the outlet pressure $P_{33}$ below a safety threshold value.

By means of the above innovative characteristics (the duct 51 between the compensation chamber 406A and the outlet duct 33, and the fluid-tight compensation chamber), the pressure regulator 5 not only makes it possible to extend the range of values of outlet pressure that can be achieved (i.e., increase the maximum value of the outlet pressure that can be effectively regulated), but also makes it possible to eliminate the opening 410 between the compensation chamber 406A and the external environment, which could cause undesired gas leakages towards the external environment. In fact, in the known solutions the gas can leak from the chamber 406B towards the chamber 406A on account of a non-perfect seal of the dynamic gasket 409D with respect to the inner walls of the cylinder 406 or of the dynamic gasket 409A, and from the chamber 406A the gas would be dispersed into the environment. This leakage, apart from in the case of malfunctioning of the dynamic seals, is to be considered "normal" in the case of operation of the regulator in particularly burdensome conditions, such as low external temperatures or low temperatures of the gas. In particular, in the case of use of gases that cool during their expansion on account of the Joule-Thomson effect (for example, methane), the problem is particularly felt and markedly limits the use of known pressure regulators at low temperatures (e.g., in arctic climates) in the cold-start maneuver, when the heating circuit of the pressure reducer is not yet operative (normally, in this type of applications, the engine coolant is used to heat the pressure regulator). By eliminating the opening 410 the gas is prevented from possibly leaking into the chamber 406A and hence dispersing into the environment, and this gas is conveyed towards the outlet duct 33 via the duct 51. The rise in pressure due to this leakage flow of the dynamic gaskets (409A and 409B) can be easily controlled via the pressure regulation carried out by the regulator.

In one or more embodiments, the duct 51 moreover includes a calibrated diaphragm 52 (e.g., an orifice or a narrowing in section) that is sized so as to enable passage of the gas leaking from the dynamic gaskets, without there being generated an overpressure in the chamber 406A, but that at the same time constitutes a discontinuity that filters the possible pressure oscillations in the outlet duct 33 so as to prevent any pressure oscillations downstream of the regulator from acting on the regulation of the inter-stage pressure $P_{32}$ carried out by the first stage, thus rendering problematical accurate management of the outlet pressure $P_{33}$ (for example, in the manifold or rail of an internal-combustion engine or at the inlet to the stack in a fuel cell). The size of the diaphragm 52 may vary, for example from 0.1 mm to several millimeters. Smaller sizes favor uncoupling of the chamber 406A from the outlet duct 33, whereas larger sizes are indicated in the case where high leakage values are expected. Current technology of dynamic seals enables management in safety employing a diaphragm having a size of 0.5 mm.

Table II, which is reproduced at the end of the present description, presents sixteen cases of use of a two-stage pressure regulator 5 according to the invention, for the same values of inlet pressure $P_{31}$, desired outlet pressure $P_{33}$, and flow rate of the regulator as those already analyzed in Table I (these are, then, the same sixteen use cases). The pressure regulator 5 according to the invention uses the same components (the spring 14, the PPV 20, with corresponding sizings) of the known pressure regulator 3, but adopts the further duct 51 and the fluid-tight compensation chamber. It may be noted that the behavior of the pressure regulator 5 is substantially similar to that of the known regulator 3, with the difference that, using the duct 51, the compensation chamber 406A is pressurized at the same pressure $P_{33}$ as that of the outlet duct 33, thereby causing the pressure $P_{32}$ of the intermediate duct 32 to follow the variations of the outlet pressure Pas. By so doing, the pressure difference $P_{32}$-$P_{33}$ across the valve 20 remains always within the maximum design limit (in this example, 20 bar) even when the outlet pressure $P_{33}$ is increased to high values, such as 40 bar G.

Figure 7:
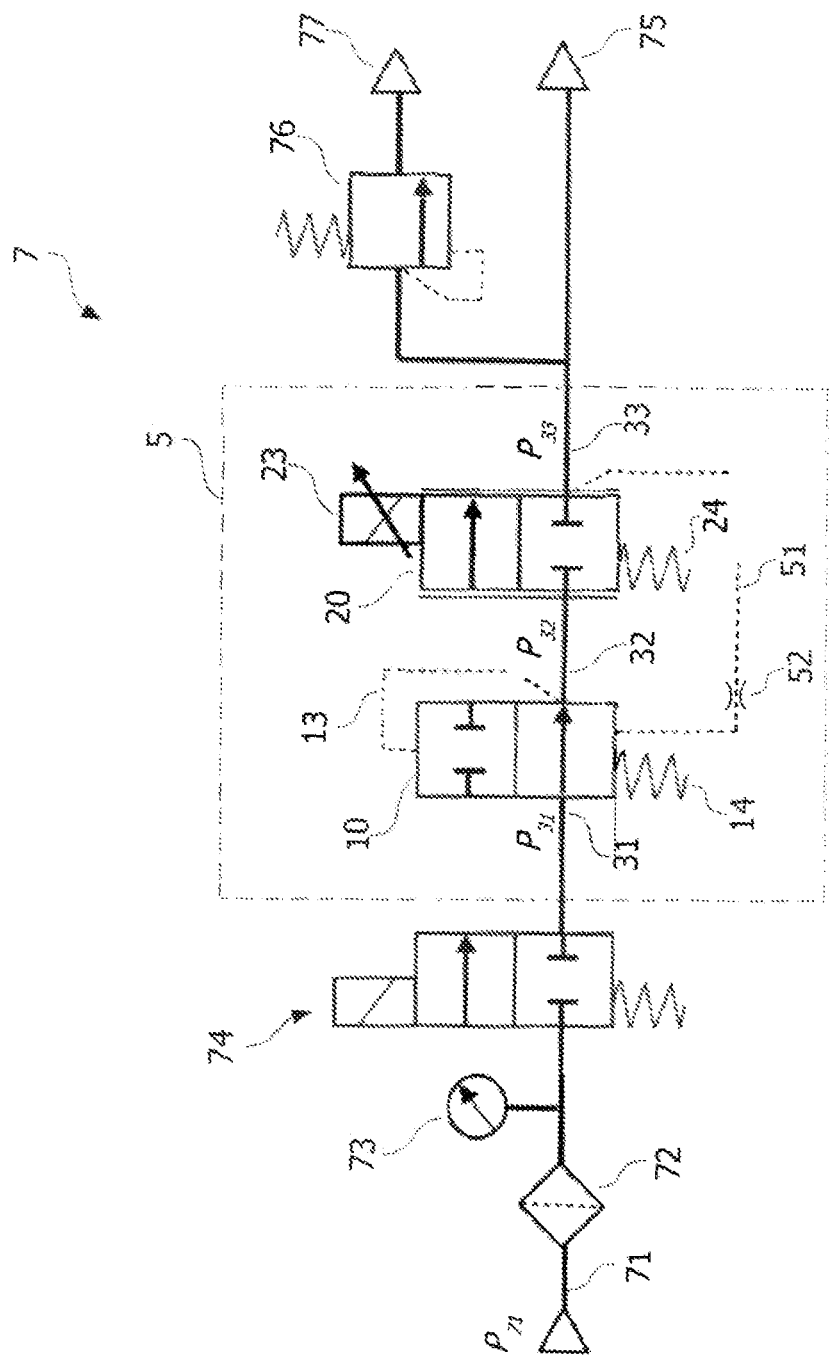
FIG. 7 presents a further diagram of the two-stage electronic pressure regulator according to one or more embodiments of the invention.

In conclusion, FIG. 7 illustrates a further diagram of an electronic pressure regulator 7 according to one or more embodiments of the invention, comprising some additional components. In particular, the pressure regulator 7 includes an inlet duct 71 configured for receiving a gas at the pressure $P_{71}$ that may, for example, be in the range from 10 bar G to 700 bar G. For instance, the inlet duct 71 can receive the gas directly from a gas container (a tank, a cylinder, or any appropriate gas-storage system) or else from another pressure reducer installed further upstream (not visible in FIG. 7). Given the wide range of the inlet pressure $P_{71}$ that can be received, the regulator 7 is suited to being used in different applications, for example as pressure reducer for systems fueled with compressed natural gas (e.g., methane)—for which it may also be provided with a heater device integrated in the pressure regulator 7 (or possibly installed on the surface of the regulator itself)—or for hydrogen-fueled systems. In the inlet duct 71 there may be set a filter 72 or screen filter for blocking any possible impurities generated during installation of the regulator in the duct 71 that might damage the internal parts of the regulator, or an integrated filter that, in addition to protecting the regulator, also performs the function of purging the gas of possible contaminants. Once again in the duct 71, preferably downstream of the filter 72, there may be set a temperature and/or pressure sensor 73. At the end of the duct 71, preferably downstream of the sensor 73, there may be set a high-pressure shut—off valve (SOV) 74. The shut—off valve 74 is of the normally closed type and has the function of preventing the flow of gas from the duct 71 in the downstream direction when the pressure regulator is not active. During operation of the system, the valve 74 is kept open. Consequently, downstream of the valve 74 the pressure $P_{31}$ at inlet to the two-stage regulator 5 is substantially equal (but for parasitic pressure drops) to the inlet pressure $P_{71}$. The section of the regulator 7 comprised between the inlet duct 71 and the outlet of the valve 74 (which corresponds to the inlet of the valve 10) is hence a high-pressure section. Set downstream of the shut—off valve 74 is a two-stage pressure regulator 5, as described in FIGS. 5 and 6. The first stage 10 brings about a first pressure reduction so that the section of the regulator 7 comprised between the valves 10 and 20 is a medium-pressure section $P_{32}$, where the pressure $P_{32}$ depends on the mechanical characteristics of the valve 10 and on the outlet pressure $P_{33}$. The second stage 20 brings about a second pressure reduction so that the section of the regulator 7 downstream of the valve 20 is a low-pressure section $P_{33}$. The outlet duct 33 of the PPV supplies the flow of gas at the desired pressure to an outlet port of the system 75. Optionally, there may be applied to the outlet duct 33 a pressure-relief valve (PRV) 76 that vents towards a ventilation line 77 to maintain the outlet pressure $P_{33}$ below a safety threshold value. As is known in the art, a pressure-relief valve 76 is brought into the closing condition by an elastic element (e.g., a spring) and is brought into the opening condition by the pressure at inlet to the valve itself so that the valve is normally closed and tends to open to reduce the inlet pressure $P_{33}$ precisely as the inlet pressure increases beyond the calibration threshold of the valve.

Of course, without prejudice to the principles of the invention, the details of construction and the embodiments may vary widely with respect to what has been described and illustrated herein purely by way of example, without thereby departing from the scope of the present invention, as defined in the annexed claims.

TABLE I

| Case No. | $P_{31}$ (bar G) | $P_{32}$ (bar G) | $P_{33}$ desired (bar G) | $P_{33}$ effective (bar G) | Flow rate |
|---|---|---|---|---|---|
| 1 | 700 | 20 | 1 | 1 | Low |
| 2 | 700 | 18 | 1 | 1 | High |
| 3 | 50 | 15 | 1 | 1 | Low |
| 4 | 50 | 13 | 1 | 1 | High |
| 5 | 700 | 20 | 15 | 15 | Low |
| 6 | 700 | 18 | 15 | 15 | High |
| 7 | 50 | 15 | 15 | 15 | Low |
| 8 | 50 | 13 | 15 | 13 | High |
| 9 | 700 | 20 | 18 | 18 | Low |
| 10 | 700 | 18 | 18 | 18 | High |
| 11 | 50 | 15 | 18 | 15 | Low |
| 12 | 50 | 13 | 18 | 13 | High |
| 13 | 700 | 20 | 40 | 20 | Low |
| 14 | 700 | 18 | 40 | 18 | High |
| 15 | 50 | 15 | 40 | 15 | Low |
| 16 | 50 | 13 | 40 | 13 | High |

TABLE II

| Case No. | $P_{31}$ (bar G) | $P_{32}$ (bar G) | $P_{33}$ desired (bar G) | $P_{33}$ effective (bar G) | Flow rate |
|---|---|---|---|---|---|
| 1 | 700 | 21 | 1 | 1 | Low |
| 2 | 700 | 19 | 1 | 1 | High |
| 3 | 50 | 16 | 1 | 1 | Low |
| 4 | 50 | 14 | 1 | 1 | High |
| 5 | 700 | 35 | 15 | 15 | Low |
| 6 | 700 | 33 | 15 | 15 | High |
| 7 | 50 | 30 | 15 | 15 | Low |
| 8 | 50 | 28 | 15 | 15 | High |
| 9 | 700 | 38 | 18 | 18 | Low |
| 10 | 700 | 36 | 18 | 18 | High |
| 11 | 50 | 33 | 18 | 18 | Low |
| 12 | 50 | 31 | 18 | 18 | High |
| 13 | 700 | 60 | 40 | 40 | Low |
| 14 | 700 | 58 | 40 | 40 | High |
| 15 | 50 | 50 | 40 | 40 | Low |
| 16 | 50 | 49 | 40 | 40 | High |

The invention claimed is:

1. An electronic pressure regulator, comprising:
an inlet duct, an intermediate duct, and an outlet duct; and
a first, mechanical, valve set between said inlet duct and said intermediate duct, and a second, electronic, valve set between said intermediate duct and said outlet duct;
wherein said first, mechanical, valve comprises:
a regulation element rigidly connected to a piston of said first, mechanical, valve, the piston being slidably mounted in a cylinder of said first, mechanical, valve, thus defining a first chamber of said cylinder and a second chamber of said cylinder that are fluidically separated by said piston;
a first elastic element housed in said first chamber and configured to push said piston in the direction of opening of said first, mechanical, valve; and
a fluid duct configured to set in fluid communication said intermediate duct and said second chamber of said cylinder so that the pressure in said intermediate duct pushes said piston in the direction of closing of said first, mechanical, valve;
said electronic pressure regulator comprising a further fluid duct configured to set in fluid communication said outlet duct and said first chamber of said cylinder so that the pressure in said outlet duct pushes said piston in the direction of opening of said first, mechanical, valve.

2. The electronic pressure regulator of claim 1, wherein said first chamber of said cylinder does not comprise any opening towards the environment external to the electronic pressure regulator.

3. The electronic pressure regulator of claim 1, wherein said further fluid duct comprises a diaphragm that hinders propagation of pressure oscillations between said outlet duct and said first chamber of said cylinder.

4. The electronic pressure regulator of claim 1, wherein said second, electronic, valve comprises a proportional valve of the normally-closed and/or direct-flow type.

5. The electronic pressure regulator of claim 1, wherein said second, electronic, valve is sized to remain closed, in the absence of an electrical opening command, when the difference between the pressure in said intermediate duct and the pressure in said outlet duct is comprised between 0 bar and 30 bar, optionally between 0 bar and 25 bar.

6. The electronic pressure regulator of claim 1, wherein said second, electronic, valve comprises:
a second elastic element configured to push a regulation element of said second, electronic, valve in the direction of closing of said second, electronic, valve; and
a solenoid electrically operatable for pushing the regulation element of said second, electronic, valve in the direction of opening of said second, electronic, valve.

7. The electronic pressure regulator of claim 1, wherein said first elastic element comprises a spring housed in said first chamber of said cylinder, said spring being arranged coaxially with respect to a longitudinal axis of said piston and abutting a first end wall of said cylinder that is proximal to said first, mechanical, valve and a first wall of said piston that faces said first chamber, said spring being pre-loaded in compression in such a way that it exerts an elastic force to push said piston away from the seat of said first, mechanical, valve.

8. The electronic pressure regulator of claim 1, wherein said fluid duct configured to set in fluid communication said intermediate duct and said second chamber of said cylinder extends longitudinally within said piston between the regulation element of said first, mechanical, valve and a second wall of said piston that faces said second chamber.

9. The electronic pressure regulator of claim 1, comprising a shut-off valve arranged in said inlet duct and configured to prevent a flow of gas from entering said first, mechanical, valve in the absence of electric power supply to said electronic pressure regulator.

10. The electronic pressure regulator of claim 1, comprising at least one of the following:
a filter arranged upstream of said first, mechanical, valve;
a temperature sensor arranged upstream of said first, mechanical, valve;
a pressure sensor arranged upstream of said first, mechanical, valve; and
a pressure-relief valve arranged in said outlet duct.

* * * * *